Nov. 24, 1959    E. S. McVEY    2,914,685
TRANSISTOR RAMP FUNCTION GENERATOR
Filed July 31, 1957
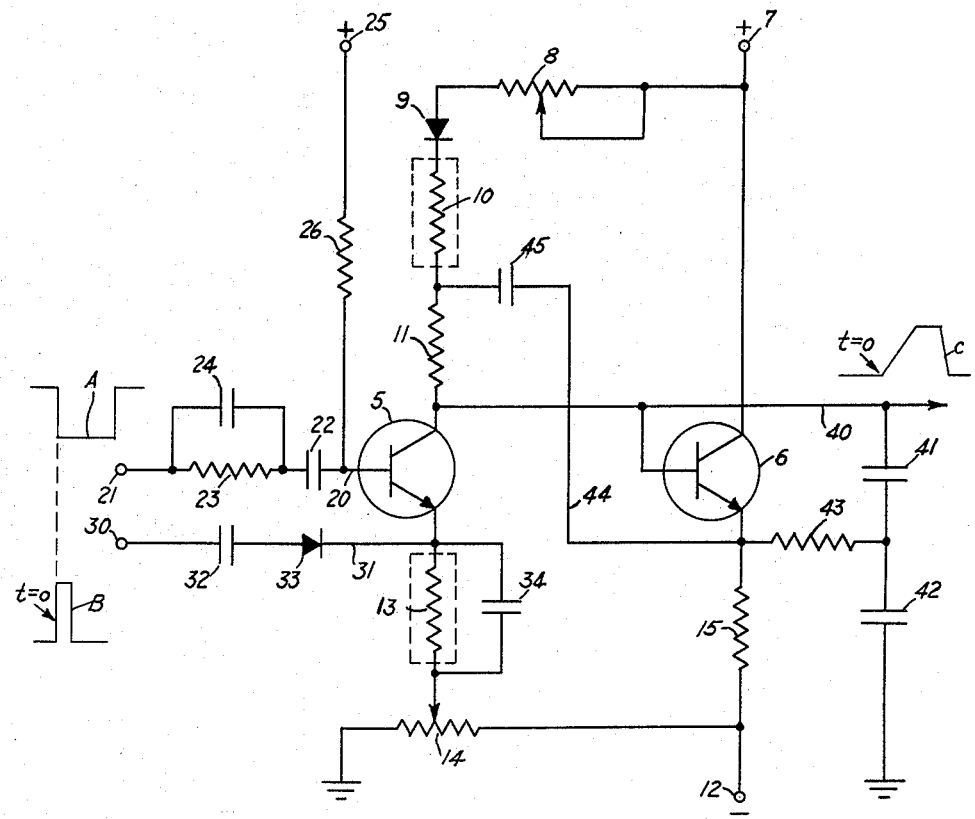
INVENTOR.
EUGENE S. McVEY
BY
*F. Schmitt*
*H. H. Loesche*
ATTORNEYS

United States Patent Office 2,914,685
Patented Nov. 24, 1959

2,914,685

TRANSISTOR RAMP FUNCTION GENERATOR

Eugene S. McVey, Fort Wayne, Ind., assignor to the United States of America as represented by the Secretary of the Navy Application July 31, 1957, Serial No. 675,501

4 Claims. (Cl. 307—88.5)

(Granted under Title 35, U.S. Code (1952), sec. 266)

The invention described herein may be manufactured and used by or for the Government of the United States of America for governmental purposes without the payment of any royalties thereon or therefor.

The invention relates to a generator for developing ramp voltages and more particularly to ramp function voltage generators of the "bootstrap" type utilizing semiconductors for producing a linear ramp voltage wave form in accordance with each trigger pulse that is adjustable in steepness for use where linear ramp voltages are needed. This invention incorporates components providing a generator of greater accuracy than the basic generator shown and described in my application, Serial No. 668,573, filed June 27, 1957, Patent No. 2,892,952 granted June 30, 1959.

A number of satisfactory ramp function voltage generators have been produced and used which are constructed with vacuum tubes in the circuitry thereof, and many of these vacuum tube circuits are of the "bootstrap" type. The primary disadvantages of such vacuum tube circuits are that such circuits are no more reliable than the vacuum tubes incorporated therein, that such circuits require considerable space, and that the weight factor of such circuits is detrimental to use in movable vehicles, such as aircraft and the like. It is well known also that vacuum tubes are often rendered inoperative or unreliable in environments of vibration, which also is a disadvantage to the use thereof in land, sea, or air vehicles.

In the present invention a ramp function voltage generator of the "bootstrap" type is constructed in a simplified circuit utilizing semi-conductors, more commonly known as transistors, to provide a very compact and light weight component for use with other components of a radar ranging system, or other composite device. In this generator two transistors are used, one to provide gating of the ramp voltages produced and the other being used as an amplifier to stabilize the linearity of the ramp function voltage. This circuit, with all of its simplicity, also incorporates temperature compensating elements to compensate for current and voltage changes resulting from the ambient temperature changes to which the transistors are submitted. It is well known by those skilled in the transistor art that the conduction of transistors is subject to change in accordance with temperature changes to which the transistors are submitted. While equipment is available to stabilize the ambient temperature in the area of electronic circuits, it appears more advisable from the standpoint of weight and bulk to compensate in the transistor circuitry itself for any such current or voltage changes resulting from temperature changes. It is therefore a general object of this invention to provide a ramp function voltage generator of the "bootstrap" type capable of producing linear ramp function voltages in accordance with triggering and timing pulses and to vary the voltage level as well as the slope of the linear voltage wave function, such ramp function voltages being unaffected by ambient temperature changes.

These and other objects, advantages, features, and uses may become more apparent to those skilled in the art as the description proceeds, with reference to the accompanying drawing illustrating the invention in a single circuit schematic.

Referring more particularly to the figure of drawing, there is illustrated a preferred form of the ramp function voltage generator which is utilized as a component in a system receiving triggering and timing signals from a preceding component and for passing ramp function voltages to succeeding components for use. While examples will be given hereinafter with reference to using this invention with a device such as a radar ranging system, it is to be understood that there are numerous applications requiring and utilizing linear ramp function voltages and this invention may be so applied. In the preferred illustration two transistors 5 and 6 are shown in which the transistor 5 is utilized herein as a gating transistor, while the transistor 6 is utilized as a feedback amplifier. The preferred illustration shows transistors 5 and 6 as being of the N-P-N type although P-N-P type transistors may be used where the polarities of the circuit are reversed. Both transistors have a collector supply voltage from a source of supply at 7 which is directly connected to the collector of transistor 6. The supply voltage from 7 is conducted to the collector of the transistor 5 serially through a variable resistor or a potentiometer coupled as a variable resistor 8, through a diode 9 oriented to permit conduction toward the collector, through a thermistor 10, and through a fixed resistance 11. The emitter of transistor 5 is coupled to a negative voltage source as at 12 through a second thermistor 13 and through a potentiometer 14, one end of the potentiometer 14 being grounded. The emitter of transistor 6 is coupled through a fixed resistance 15 to the negative voltage source 12. The thermistor 13 and the fixed resistor 15 are emitter biasing resistors, the bias on the emitter of transistor 5 being adjustable by the potentiometer 14, as will be made clear hereinafter.

The transistor 5 has the base thereof coupled through a conductor 20 to a terminal 21 for receiving negative gating pulses, as shown by the wave form A above this conductor. The conductor 20 has a capacitor 22 in serial relation with a parallel connected resistor 23 and capacitor 24. The resistor 23 substantially isolates the preceding component (not shown) during conduction periods of transistor 5, and the capacitor 24 differentiates the gating pulse. The base of transistor 5 is also coupled to a slightly positive voltage source connectable to the terminal 25 to produce a base bias current through the resistor 26. The collector voltage and the voltage biases on the base and emitter of transistor 5 are arranged such that the transistor 5 is normally conducting near the saturation point thereof.

A positive timing pulse which is adapted to be applied to the terminal 30 is conducted by the conductor 31 through a capacitor 32 and a diode 33 in series directly to the emitter of transistor 5. The thermistor 13 is shunted for alternating currents through a capacitor 34. The terminal 30 is adapted to be connected to a timing pulse generator to produce positive-going timing pulses. While the means for producing the pulses A and B is not shown or described, a single circuit component may produce both of these pulses so that the leading edge of both pulses will be coincident in point of time, which is important to the operation of the present ramp function voltage generator, as will be described presently.

The base of transistor 6 is directly coupled to the collector of transistor 5, this collector and base coupling providing the output circuit by way of the conductor 40. The output conductor 40 is coupled to ground through two capacitors 41 and 42 in series, which coupling by virtue of its connection with resistor 11 forms an integration circuit for current through resistor 11 to produce the ramp function voltages on the output 40. The junction of the storage capacitors 41 and 42 is coupled through a compensating resistor 43 to the emitter of transistor 6. A feedback circuit from the emitter of transistor 6 by way of conductor 44 through a capacitor 45 is coupled to the junction of the thermistor 10 and the fixed resistor 11, thereby placing the base and emitter of transistor 6 across the fixed resistance 11.

While the collector and emitter voltages are shown as being supplied from a single source, it is to be understood that these emitter and collector terminals may be supplied voltages from separate sources or by a single source properly tapped. Such a single source of voltage supply may also supply the base voltage at the terminal 25 for the transistor 5.

In the operation of the illustrated form of this invention, as shown by the drawing, let it be assumed purely for the purpose of example that the voltage wave pulse applied at the terminal 21 is of a negative magnitude of approximately twenty volts and the time duration of this wave is thirty microseconds. Let it also be assumed for the purpose of this example that the timing pulse B, adapted to be applied to the terminal 30, is of a magnitude of approximately twenty-three volts for one-half microsecond. As hereinbefore stated, the transistor 5 is biased to be conducting near its saturation point. When the gating pulse A and the timing pulse B are applied simultaneously to the base and emitter, respectively, of the transistor 5, the transistor will be cut off immediately or placed in a quiescent state, except for a slight amount of leakage currents generally recognized in the art as $I_{co}$. The networks 22, 23, and 24 and the elements 32 and 33 normally isolate the triggering circuit impedance from the transistor 5 but allow the pulses to pass through, as explained hereinbefore. Upon the transistor 5 being made nonconductive or quiescent, the voltage on the collector of transistor 5 immediately begins to rise, as shown by the output wave form C at the point represented as $t=0$, which is the same time $t=0$ representative of the leading edges of wave forms A and B. Current from the voltage source 7 is conducted via the variable resistor 8, diode 9, thermistor 10, and fixed resistor 11 to charge the storage capacitors 41 and 42. As long as the current through the resistor 11 remains constant the voltage across this resistor will remain constant and consequently the ramp function of the output voltage wave form C will remain linear. Upon any tendency of the current to vary through the resistor 11 to produce a voltage change across this resistor, this voltage change will appear across the base and emitter of transistor 6 which is amplified and fed back by way of the conductor 44 and capacitor 45 to adjust the voltage level at the junction of thermistor 10 and resistor 11 to maintain a constant current through the fixed resistor 11, thereby maintaining the ramp function voltage on the linear output, as shown by curve C. In this manner the feedback amplifier operating as transistor 6 will maintain the current through, and the voltage across, the fixed resistor 11 at a constant value to maintain linearity in the ramp function of the voltage wave form C since a constant current applied to the storage capacitors 41 and 42 will produce a constant voltage rise in the output circuit 40. If the emitter-to-base voltage of transistor 6 changes in any way, a current is fed through the compensating resistor 43 to the storage capacitors 41 and 42 to compensate for such emitter-to-base voltage changes.

Since it is inherent in the transistors known today to vary in current conduction in accordance with ambient temperature changes, thermistors 10 and 13 are placed in the circuit to compensate for any current conduction of the transistor 5 resulting from temperature changes. Most important, the temperature changes of the transistor 5 would change the starting potential of the output wave form represented by C if such voltage changes caused by temperature changes were not compensated. The thermistors 10 and 13 should be chosen to compensate exactly not only for voltage changes resulting in temperature changes of transistor 5 but for other errors introduced in the circuit as a whole. This can be accomplished by the selection of proper values for the thermistors 10 and 13. That is, any current increase produced by the transistor 5 or other parts of the circuitry as a result of temperature changes can be compensated by using thermistors having temperature coefficients of proper value.

The diode 9 is used to isolate the transistor 5 from the voltage source 7 to prevent the power supply impedance from loading this circuit. The variable resistor or potentiometer 8 may have its adjustable tap varied to control the slope of the ramp function voltage in the output curve C; that is, by adjustment of the element 8 the current flow can be increased or decreased to increase or decrease the linear slope, respectively, of the output curve C. The potentiometer 14 may likewise be adjusted through the movable tap thereof to vary the starting potential of the output voltage wave illustrated by C. With the gating and timing pulses applied, as shown by A and B, an output ramp function voltage, as shown by C, may be accomplished which may be made to vary from substantially zero voltage at the point $t=0$ to approximately the voltage applied by the supply source at the terminal 7. If, for example, the terminal supply voltage 7 is twenty-two and one-half volts, the ramp voltage may approach twenty-two and one-half volts at its top portion represented by the top flat portion in the output curve C. The time interval from the point $t=0$ in the output curve C to the point at which the trailing edge of the wave form is started initially is approximately thirty microseconds or the time lapse of the negative gating pulse A. The slight angle of the trailing edge of the wave form C represents the time interval required for the transistor 5 to reset the circuit to initial conditions.

It is important to produce a ramp function voltage, as shown by the curve C, such that the ramp voltage does not have any error at the beginning of the ramp. The time pulse B applied to the emitter of transistor 5 assists the negative gating pulse A in producing an extremely sharp cutoff of transistor 5 whereby substantially no voltage errors are produced at the point $t=0$ in the curve C. That is, the ramp voltage starts upward without any curve whatsoever, any such voltage errors being one-tenth microsecond or less from the start of the timing pulse. Such voltage error is negligible in the use of such ramp function voltage.

While many modifications and changes may be made in the circuit construction or voltage relationships or polarities in producing a ramp function voltage of high accuracy, it is to be understood that I desire to be limited only by the scope of the appended claims.

I claim:

1. A transistor ramp function voltage generator comprising: gating and amplifier three-electrode transistors, each having a potential across the collector and emitter electrodes thereof, the gating transistor having the potential coupled through a diode, a temperature compensating resistor, and a fixed resistor to the collector electrode and the emitter electrode connected through a second temperature compensating resistor; means for controlling the current from said potential; an output circuit coupling the collector electrode of said gating transistor and the base electrode of said amplifier transistor; a feedback network coupling the emitter electrode of said amplifier transistor with the junction of said temperature compensating resistor and said fixed resistor through a capacitor for stabilizing the current flow through said fixed resistor at a constant value; a voltage storing network consisting of a pair of capacitors in serial relation between said output circuit and ground for storing voltages linearly resulting from the constant current passing through said fixed resistor to charge said capacitors when said gating transistor is nonconductive; a network applying negative gating pulses to the base electrode of said gating transistor and a network applying positive timing pulses to the emitter electrode of said gating transistor, the leading edges of said applied pulses being coincident for producing sharp cutoff of the conduction of said gating transistor; and means for varying the bias on said gating transistor for varying the starting potential of the voltage wave on said output circuit whereby ramp voltages are developed in accordance with the applied gating pulses.

2. A ramp function voltage generator as set forth in claim 1 wherein said feedback network includes a resistive coupling between said amplifier transistor emitter and the junction of said serially coupled capacitors to compensate for changes in base-to-emitter voltages of said amplifier transistor.

3. A ramp function voltage generator as set forth in claim 2 wherein said temperature compensating resistors are thermistors.

4. A semiconductor ramp function voltage generator comprising: a pair of semiconductor devices each having base, collector, and emitter terminals; trigger circuits coupled to the base and emitter terminals of one semiconductor device producing a negative pulse on the base and a positive pulse on the emitter of said one semiconductor device with a potential coupled across the collector and emitter terminals thereof; a resistive element in the potential coupling across said collector and emitter being serially coupled between the collector of said one device and a source of potential; feedback circuit coupled from the base and emitter terminals of the other semiconductor device to said resistive element to stabilize the current flow through said resistive element at a constant value, said feedback circuit coupling the base of said other semiconductor device to the collector of said one semiconductor device; temperature compensating means including a thermistor coupled to the emitter of said one semiconductor device and a thermistor in the potential coupling in serial relation with and coupled to said resistive element to compensate for conduction changes produced by temperature changes of said device; a storage network consisting of two capacitors in serial relation, one end of one of said capacitors being coupled to the collector of said one semiconductor device and to the base of the other semiconductor device and to said resistive element, the other end of said serially connected capacitors being grounded, with a junction of said serially connected capacitors being resistive coupled to the emitter of said other semiconductor device, said storage network operating to store a voltage therein in accordance with a constant current passing through said resistive element; and an output circuit coupled to said storage network.

References Cited in the file of this patent

UNITED STATES PATENTS

| 2,412,063 | Rosentreter | Dec. 3, 1946 |
| 2,439,324 | Walker | Apr. 6, 1948 |
| 2,533,001 | Eberhard | Dec. 5, 1950 |
| 2,597,322 | Higinbotham | May 20, 1952 |
| 2,665,845 | Trent | Jan. 12, 1954 |
| 2,808,471 | Poucel et al. | Oct. 1, 1957 |
| 2,810,024 | Stanley | Oct. 15, 1957 |

FOREIGN PATENTS

| 742,967 | Great Britain | Jan. 4, 1956 |

OTHER REFERENCES

Shea, R. F.: Transistor Circuits Book, published by John Wiley & Sons, Inc., New York, Sept. 15, 1953, pages 164–182.